United States Patent [19]

Sweet et al.

[11] 4,380,276

[45] Apr. 19, 1983

[54] SLACK ADJUSTER FOR VEHICLE BRAKES

[75] Inventors: Roger Sweet, Fowlerville; Leonard T. Tribe, Ann Arbor, both of Mich.

[73] Assignee: Kelsey-Hayes Co., Romulus, Mich.

[21] Appl. No.: 167,308

[22] Filed: Jul. 21, 1980

[51] Int. Cl.³ ............................................ F16D 65/56
[52] U.S. Cl. ......................... 188/79.5 K; 188/196 BA
[58] Field of Search ............... 188/79.5 K, 71.9, 71.8, 188/196BA, 196 B, 79.5 R, 79.5 GT, 196 R; 192/111 A

[56] References Cited

U.S. PATENT DOCUMENTS

| 3,997,035 | 12/1976 | Zeidler | 188/79.5 K |
| 3,997,036 | 12/1976 | Zeidler | 188/79.5 K |
| 4,019,612 | 4/1977 | Mathews et al. | 188/79.5 K X |
| 4,057,128 | 11/1977 | Coupland | 188/79.5 K |

*Primary Examiner*—Douglas C. Butler
*Attorney, Agent, or Firm*—Ralph J. Skinkiss; Richard D. Emch

[57] ABSTRACT

An improved slack adjuster used for establishing the running clearance between brake shoes and a brake drum. A brake actuating cam is attached to a worm gear mounted in a slack adjuster housing. When the slack adjuster is rotated through greater than a predetermined increment which establishes the running clearance for the brakes, a worm is rotated to change the angular position between the worm gear and the slack adjuster housing.

4 Claims, 16 Drawing Figures

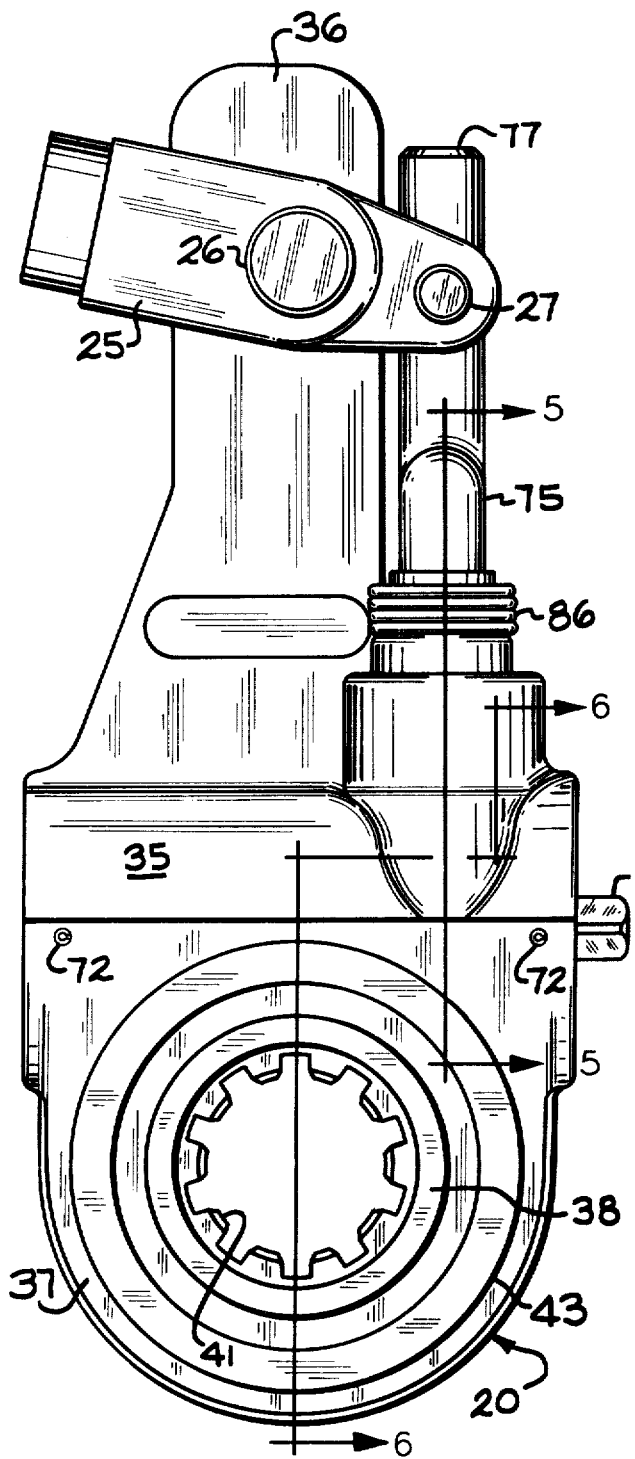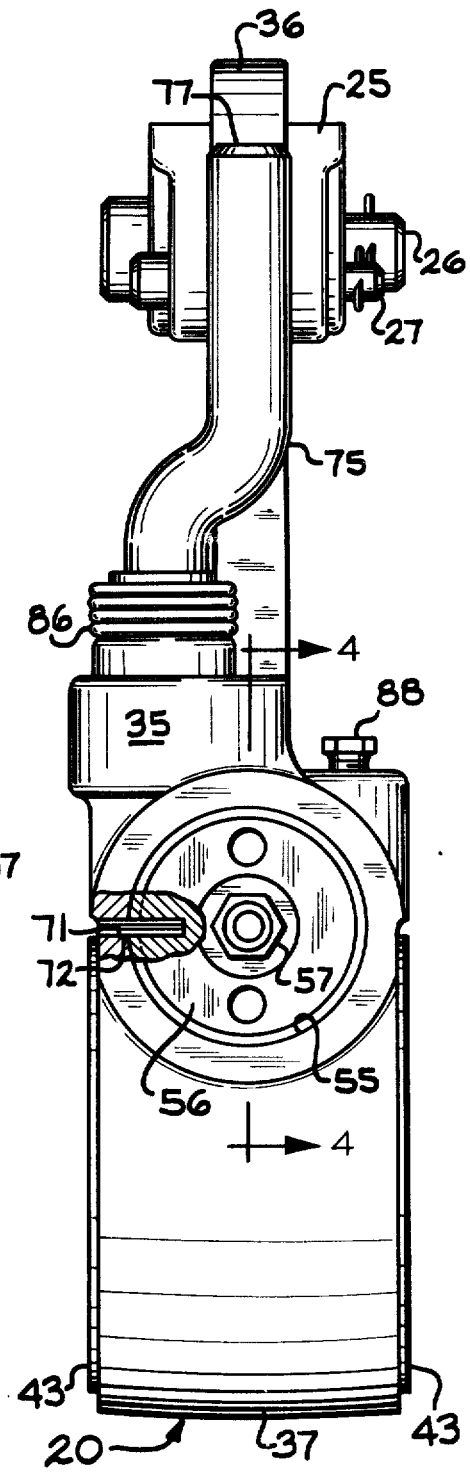
FIG. 2
FIG. 3

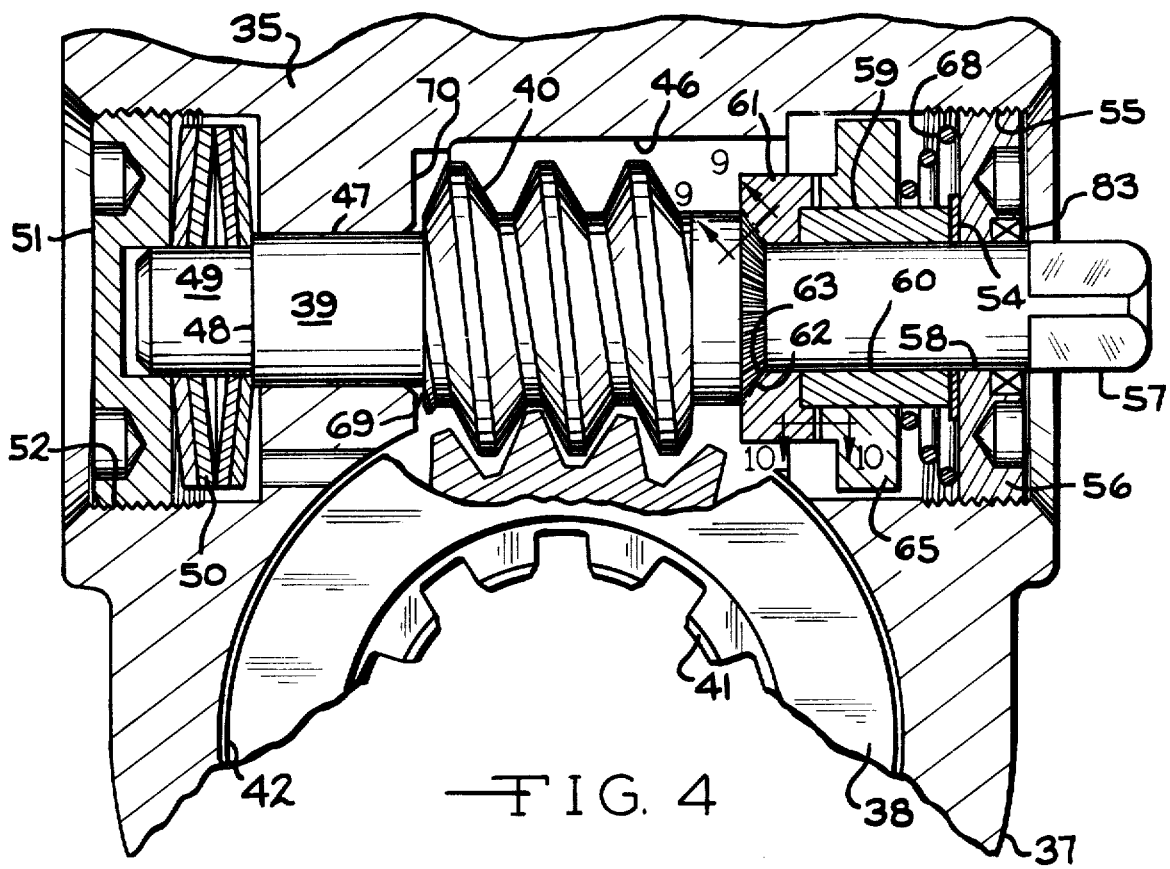
FIG. 4
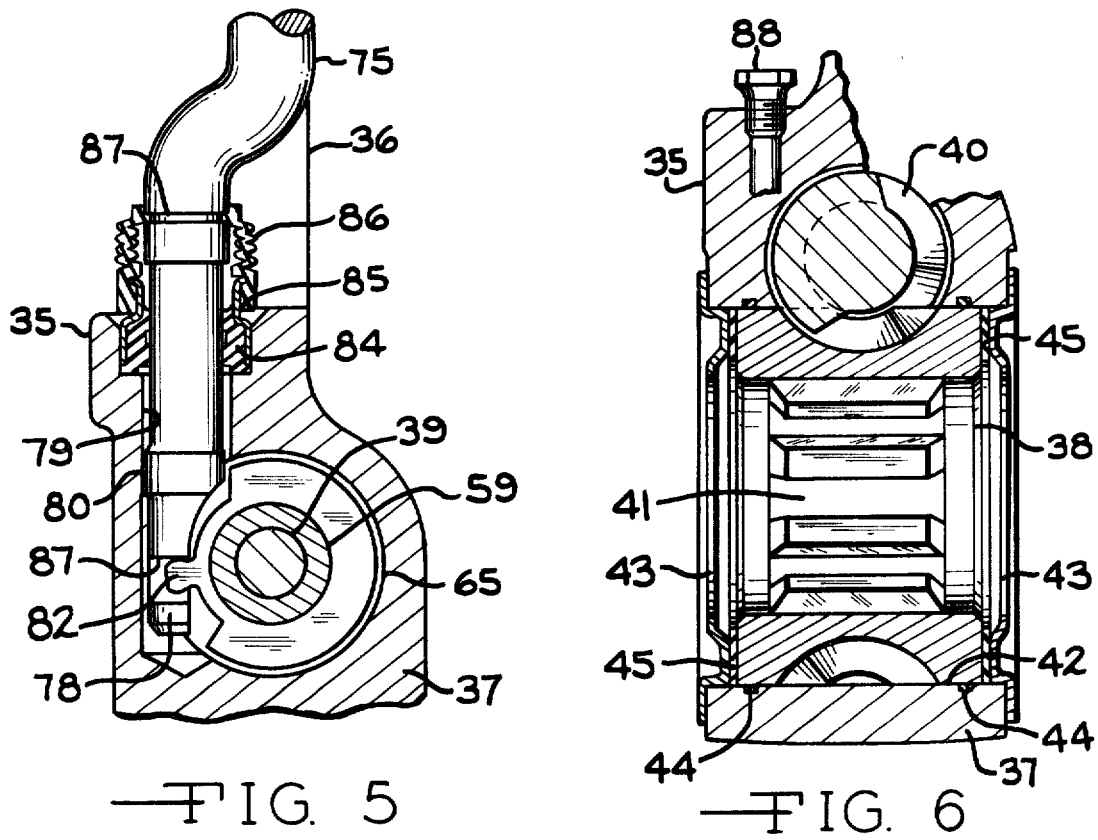
FIG. 5
FIG. 6

SLACK ADJUSTER FOR VEHICLE BRAKES

DESCRIPTION

BACKGROUND OF THE INVENTION

This invention relates to slack adjusters for vehicle brakes and particularly to an improved automatic slack adjuster for cam actuated internally expanding shoe brakes of the type commonly used in large vehicles such as truck trailers.

Heavy vehicles, such as truck trailers, are typically provided with air brakes. An air brake includes an air chamber to which air is supplied during braking. When air is supplied to the chamber, a piston extends from the chamber and is connected through a linkage for rotating a cam which in turn expands brake shoes into contact with a brake drum. Then the brake pedal is released and the compressed air is vented from the chamber, the piston retracts into the air chamber and the cam is rotated in a reverse direction so that the brake shoes move clear of the brake drum. Ideally, a minimum clearance is provided between the brake shoes and the brake drum when the brakes are released. This clearance should be uniform for all brakes so that uniform braking forces are applied to the wheels on both sides of the vehicle. The clearance between the brake shoes and the brake drum should be small so that the piston rod extending from the air chamber need move only a small distance to engage the brakes. However, sufficient clearance must be provided to prevent the brake shoes from dragging on the drum, even when they are hot and experiencing thermal expansion. Any drag between the brake shoes and the drum will cause excessive wear on the shoes, over heating and excessive fuel consumption for the vehicle.

Slack adjusters are well known in the prior art for adjusting the clearance between the brake shoes and the brake drum when the brake is released. Manual adjusters are generally undesirable since they require a fairly frequent adjustment as the brake shoes become worn. If the manual adjustment is not properly performed, either an inadequate clearance is provided and the shoes will tend to drag on the brake drum or an excessive clearance is provided and the brakes will prematurely require re-adjustment.

Automatic slack adjusters for vehicle brakes are known in the prior art and are exemplified, for example, in U.S. Pat. Nos. 3,997,035, 3,997,036 and 4,057,128. These adjusters are adapted to form the link connecting the brake air chamber piston rod with the cam shaft for rotating the cam shaft in response to linear movement of the piston rod. The automatic slack adjuster includes a worm gear which is keyed or connected through splines to the cam shaft which moves the brake shoes. A worm mounted to rotate about an axis perpendicular to the cam axis engages the worm gear for establishing the angular position between a housing for the slack adjuster and the cam shaft. Various devices are provided in the prior art for rotating the worm gear to automatically change the angular position between the slack adjuster housing and the cam shaft for eliminating slack as the brake shoes become worn. However, problems have occurred with prior art slack adjusters due to poor reliability, excessive weight, complicated and expensive construction and in providing a design which accurately establishes a desired clearance between the brake shoes and the brake drum when the brakes are released. Problems also have occurred in prior art slack adjusters from both high frequency and low frequency vibration.

SUMMARY OF THE INVENTION

According to the present invention, an improved slack adjuster is provided for maintaining a predetermined clearance between brake shoes and a brake drum for brakes of the type used on heavy duty vehicles. The slack adjuster forms a linkage between an air actuated piston rod and a cam shaft which, when rotated, moves the brake shoes into and out of engagement with the brake drum. The slack adjuster includes a housing mounting a worm gear which is keyed to the cam shaft. The air actuated piston rod is connected through a clevis and clevis pin to the end of an arm which is integrally formed on the slack adjuster housing. As the piston rod moves in a linear direction, the slack adjuster rotates the cam to actuate or release the brakes.

The clevis connecting the piston rod from the air piston to the arm on the slack adjuster housing also is connected through a second clevis pin to a link. Each time brakes are applied or released, the link is moved a short distance out of or into the slack adjuster housing in a direction generally parallel to the arm extending from the slack adjuster housing. The slack adjuster housing also mounts a worm which engages the worm gear and rotates about an axis perpendicular to the axis of the worm gear. The link is connected through a drive and a coupling for rotating the worm to change the angular relationship between the brake cam and the slack adjuster housing. Adjustment is made only as the brakes are applied and after the slack adjuster has rotated through a predetermined range which establishes the clearance between the brake shoes and the brake drum when the brakes are released. The coupling rotates the worm to adjust slack up to a predetermined loading on the slack adjuster. After the predetermined loading is reached, the worm is disengaged from the coupling to inhibit further adjustment without affecting the operation of the brakes. Through this arrangement, a desired clearance is maintained between the brake linings and the brake drum. Since the slack adjuster is responsive to the clearance between the linings and the drum, as represented by the rotation of the cam required to actuate the brake, and also the load on the brakes, there is no risk of over adjustment which would in turn cause excessive wear and overheating of the brake lining. In a panic braking situation when excessive pressure is applied to the slack adjuster, the worm moves axially against a spring and disengages from the coupler to prevent over adjustment of the brakes.

Accordingly, it is an object of the invention to provide an improved slack adjuster for vehicle brakes.

Another object of the invention is to provide an improved slack adjuster which adjusts the clearance on vehicle brakes as the brakes are applied.

Other objects and advantages of the invention will become apparent from the following detailed description, with reference being made to the accompanying drawings.

BRIEF DESCRIPTION OF THE DRAWINGS

FIG. 2 is a side elevational view of the slack adjuster of the present invention;

FIG. 3 is a front elevational view of the slack adjuster of the present invention;

FIG. 4 is a fragmentary cross sectional view as taken along line 4—4 of FIG. 3;

FIG. 5 is a fragmentary cross sectional view as taken along line 5—5 of FIG. 2;

FIG. 6 is a fragmentary cross sectional view as taken along line 6—6 of FIG. 2;

DESCRIPTION OF THE PREFERRED EMBODIMENT

Figure 1:
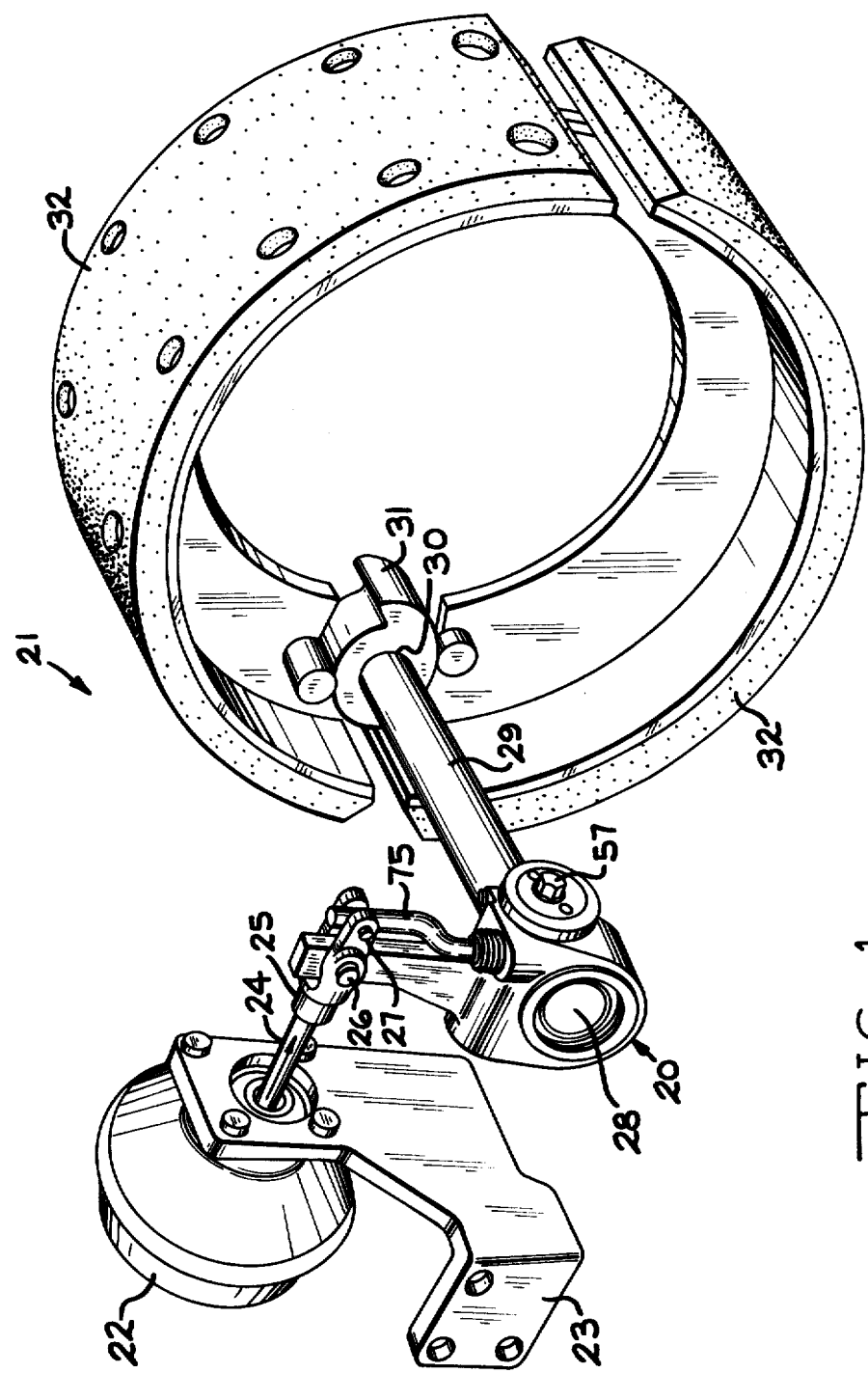
FIG. 1 is a fragmentary perspective view showing the slack adjuster of the present invention connected between an air piston and an S-cam for actuating a pair of brake shoes.
Figure 7:
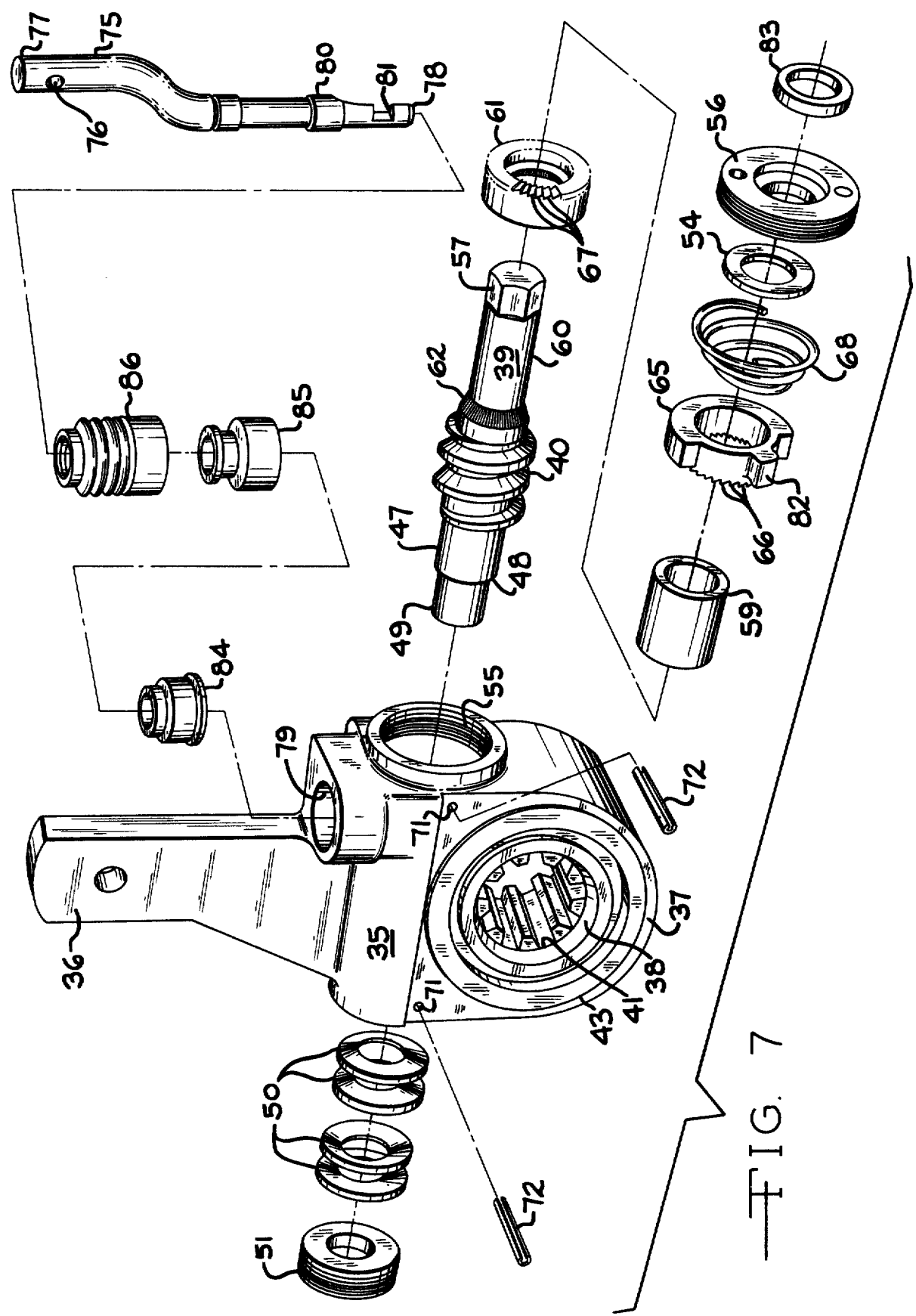
FIG. 7 is an exploded perspective view showing a portion of the components of the slack adjuster of the present invention.
Figure 8:
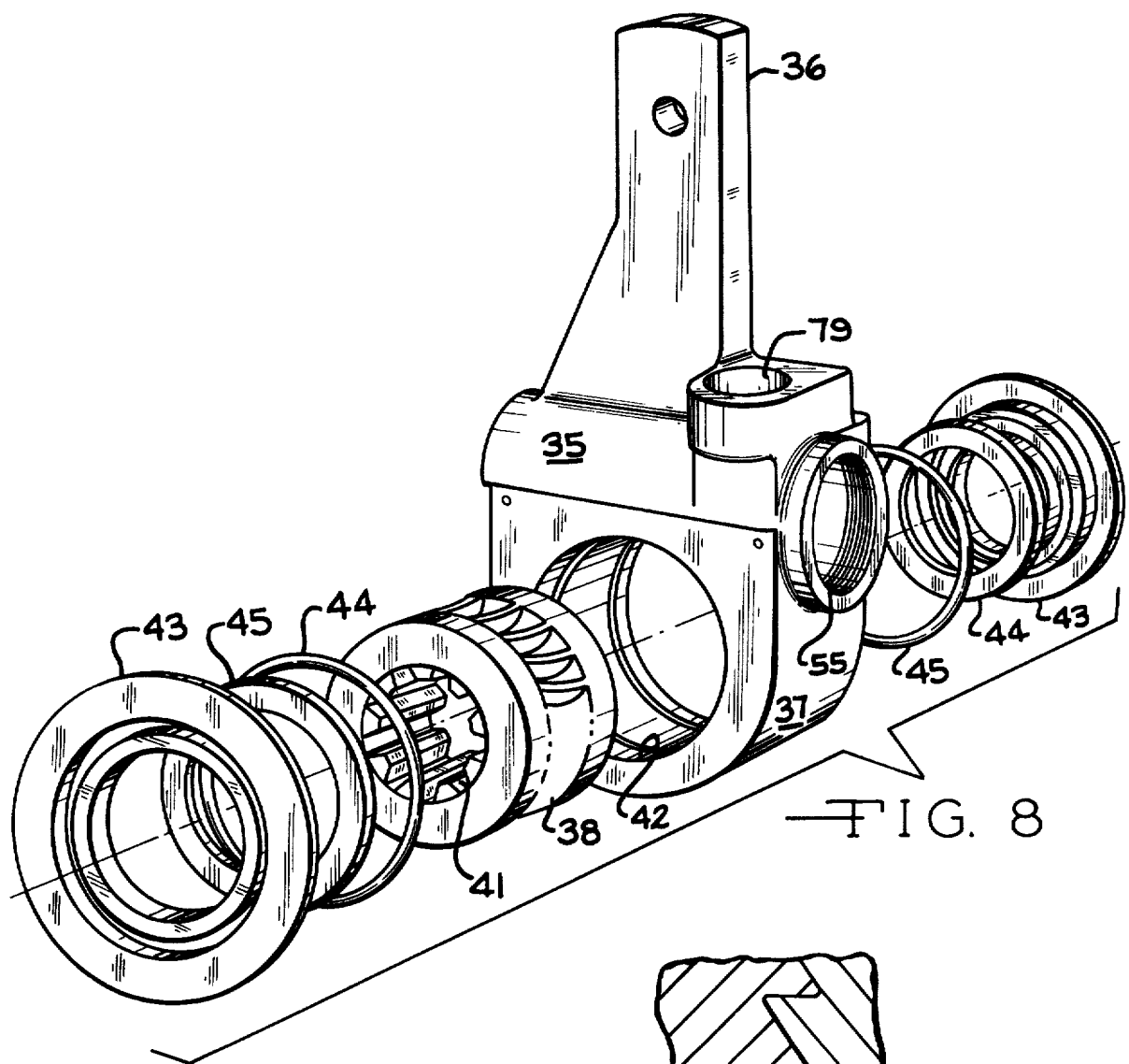
FIG. 8 is an exploded perspective view showing the arrangement of other components of the slack adjuster of the present invention.

Turning now to the drawings and particularly to FIG. 1, a slack adjuster 20 constructed in accordance with the present invention is illustrated connected to a fragmentary portion of a brake system 21 for a vehicle, such as a truck trailer. The brake system 21 includes a conventonal brake air chamber 22 which is mounted on a bracket 23. A piston rod 24 extends from the brake air chamber 22 and is connected through clevis 25 and two clevis pins 26 and 27 to the slack adjuster 20. The slack adjuster 20 is attached to one end 28 of a cam shaft 29. An opposite end 30 of the cam shaft 29 is attached to an S-cam 31. As the cam shaft 29 is rotated, the S-cam 31 acts equally and oppositely on two brake shoes 32 to force the brake shoes 32 into frictional engagement with a conventional brake drum (not shown). In operation, pressurized air is supplied to the brake air chamber 22 when the vehicle brake pedal is depressed. The pressurized air causes the piston rod 24 to extend in a linear direction away from the brake air chamber 22. As the piston rod 24 extends, the slack adjuster 20 rotates to in turn rotate the cam shaft 29, thereby causing the S-cam 31 to move the brake shoes 32 into frictional engagement with the brake drum. When the brake pedal is released, air flows from the brake air chamber 22 causing the piston rod 24 to retract into the brake air chamber 22. Retraction of the piston rod 24 in turn rotates the slack adjuster 20, the cam shaft 29 and the S-cam 31 to allow the brake shoes 32 to retract a predetermined distance or clearance from the brake drum. As the brake shoes 32 become worn, it is necessary to rotate the slack adjuster 20, the cam shaft 29 and the S-cam 31 through a greater angle to apply the brakes. This greater rotational movement required to apply the brakes causes the slack adjuster 20 to automatically change the angular position between the slack adjuster 20 and the cam shaft 29 to reduce the shoe to drum clearance to a desired level, as will be discussed in greater detail below.

Turning now to FIGS. 2–8, the slack adjuster 20 is illustrated in detail. The slack adjuster 20 has a housing 35 including an upper arm 36 to which the clevis 25 is attached by means of the clevis pin 26. The housing 35 further includes a lower section 37 which encloses a worm gear 38 and a shaft 39 having a region which defines a worm 40. The worm gear 38 has a splined central opening 41 which engages the cam shaft 29. The worm gear 38 fits within an opening 42 through the lower housing section 37 and is retained in place by means of both the worm 40 and two caps 43 which are pressed into opposite ends of the opening 42. O-ring seals 44 are positioned between the worm gear 38 and the housing opening 42 and washer like cap seals 45 are positioned between the caps 43 and the worm gear 38. The seals 44 and 45 prevent contaminants such as water and dirt from entering the housing 35.

The shaft 39 is mounted within a stepped opening 46 in the lower housing section 37 which extends perpendicular to the worm gear opening 42. The shaft 39 has a bearing section 47 adjacent to the worm 40 which is rotatably supported by the housing 35. An inward step 48 is formed on the shaft 39 between the bearing section 47 and a shaft end 49. A spring 50 comprising an assembly of Belleville washers is positioned concentrically over the shaft end 49 and extends between the shaft step 48 and an end cap or plug 51 which engages a threaded end 52 of the stepped housing opening 46. The Belleville washers 50 bias the shaft 39 in a direction for engagement with a coupler, which is described in detail below.

Figure 9:
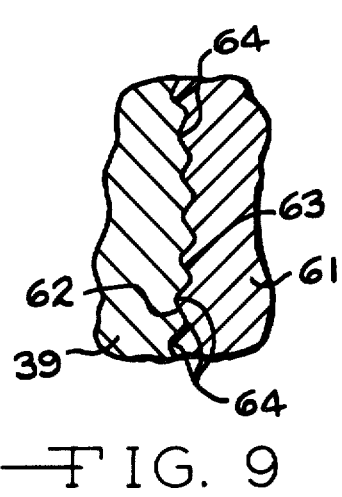
FIG. 9 is an enlarged fragmentary cross sectional view taken along line 9—9 of FIG. 4.

The housing opening 46 has a second threaded end 55. A cap 56 is threaded into the housing end 55 and defines a central opening 55 through which an end 57 of the shaft 39 projects. The shaft end 57 preferably is hexagonally shaped for receiving a wrench for an initial manual adjustment of the slack adjuster 20. Within the housing opening 46, a bushing spacer 59 is positioned coaxially over a reduced diameter section 60 of the shaft 39 and is located to abut the cap 56. A washer 54 is positioned between the bushing spacer 59 and the cap 56. The washer 54 is of hardened steel and functions to reduce friction between the end cap 56 and the bushing spacer 59 which may be of powdered metal. A coupling 61 also is positioned over the reduced diameter shaft section 60 to extend between the bushing spacer 59 and a conical shoulder 62 on the shaft 39 adjacent the worm 40. As best illustrated in the enlarged fragmentary cross section of FIG. 9, the conical shoulder 62 on the shaft 39 and an abutting conical surface 63 on the coupling 61 are provided with rounded grooves, teeth or corrugations 64 to define a grooved slip surface. Forces exerted on the shaft 39 by the Belleville washers 50 are applied through the conical shoulder 62 on the shaft 39 and the corresponding abutting surface 63 on the coupling 61 and from the coupling 61 through the bushing 59, the washer 54 and the cap 56 to the housing 37.

Figure 10:
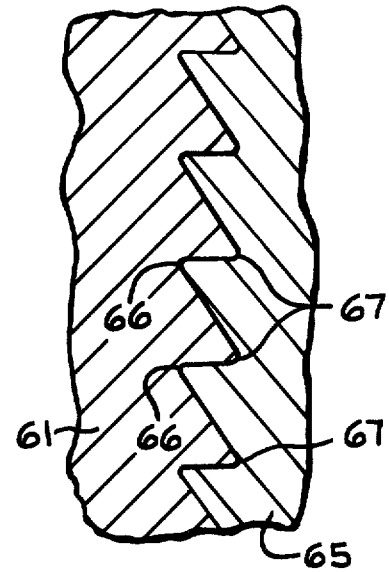
FIG. 10 is an enlarged cross sectional view as taken along line 10—10 of FIG. 4.

A drive 65 is positioned to rotate on the bushing spacer 59 and includes a plurality of ratchet teeth 66 which engage corresponding ratchet teeth 67 on the coupling 61, as best illustrated in the enlarged fragmentary cross sectional view of FIG. 10. A compresion spring 68 is positioned between the drive 65 and the cap 56 for biasing the drive 65 against the coupling 61. The spring 68 is relatively weak as compared to the spring force of the Belleville washers 50. The spring 68 functions to allow the drive 65 to rotate relatively easy with respect to the coupling 61 in one direction while urging the teeth 66 and 67 into engagement with one another to prevent rotation in a reverse direction when the drive 65 rotates the worm 40 to take up slack in the brake system 21.

In assembling the slack adjuster 20, the shaft 39, the coupling 61, the bushing spacer 59, the drive 65, the spring 68 and the washer 54 are positioned within the housing opening 46. The cap 56 then is screwed into the threaded opening end 55 until a predetermined clearance or gap 69 is formed between the worm 40 and a step 70 in the opening 46. The gap 69 permits sufficient axial movement of the shaft 39 for disengagement of the grooves or teeth 64 on the conical shaft shoulder 62 from the grooves or teeth 64 on the abutting coupling surface 63. The Belleville washers 50 are positioned on the shaft end 49 and the cap 51 is screwed into the threaded opening end 52. The cap 51 is tightened to provide a desired end loading on the shaft 39 which may, for example, be in the range of 900 to 1,000 pounds force. The loading exerted by the Belleville washers 50 on the shaft 39 determines the force required before slippage occurs between the conical shaft shoulder 62 and the abutting coupling surface 63. After the two end caps 51 and 56 are positioned, they may be locked in place with set screws or by drilling holes 71 through the housing 35 and into each of the caps 51 and 56 and pressing retainer pins 72 into the holes 71.

An adjustment link 75 extends between the clevis 25 and the lower housing section 37. The clevis pin 27 extends through an opening 76 in an upper end 77 of the link 75. The link 75 has a lower end 78 which extends into an opening 79 in the lower housing section 37. A shoulder 80 on the lower link end 78 guides the link 75 within the housing opening 79. The link 75 also defines a slot 81 in its lower end 78. A drive tooth 82 on the drive 65 is positioned within the slot 81. During operation of the slack adjuster 20, the link 75 is reciprocated in the opening 79. As the link 75 is pulled a short distance out of the opening 79, the drive tooth 82 is raised to rotate the drive 65 and thence to rotate the shaft 39. As the shaft 39 rotates, the worm 40 advances the worm gear 38 to take up the slack in the brake system 21. When the link 75 is subsequently moved downwardly into the housing opening 79, the drive tooth 82 on the drive 65 is pushed downwardly and indexing occurs between the drive 65 and the coupling 61 due to the action of the ratchet teeth 66 and 67 and the relatively weak spring 68.

The various openings in the lower housing section 37 are sealed to prevent contamination from dirt, water, salt, and the like. As previously discussed, cap seals 45 and O-ring seals 44 form seals between the worm gear 38 and the lower housing section 37. In addition, a seal 83 is located within the cap 56 to form a seal between the shaft section 60 and the cap 56 while permitting the shaft 39 to rotate. A link seal 84 and a metal seal insert 85 are positioned between the link 75 and the opening 79 in the lower housing section 37. The link seal 84 permits the link 75 to reciprocate within the opening 79 while preventing contaminants from entering the opening 79. A boot 86 also extends between a groove 87 in the link 75 and the seal insert 85. The boot 86 prevents contaminants from entering the region between the reciprocating link 75 and the link seal 84. In addition to preventing contaminants from entering into the housing 37, the various seals described above also function to retain a lubricating grease within the shaft opening 46 and the link opening 79 in the lower housing section 37. A suitable fitting 88 is provided for injecting lubricant into these openings.

Turning again to FIG. 1, it will be seen that the air chamber piston 24 reciprocates in a linear direction as air is applied to or bled from the brake air chamber 22. As the piston rod 24 extends, the slack adjustor 20 rotates the cam shaft 29. Since the brake air chamber 22 is rigidly mounted on the bracket 23, and the piston rod 24 only moves in an axial direction, the rotation of the slack adjuster 20, as the brakes are applied, causes the link 75 to be pulled upwardly out of the housing opening 79. On the other hand, when the brakes are released by retracting the piston rod 24 into the air chamber 22, the reverse rotation for the slack adjuster 20 causes the link 75 to be pushed downwardly into the housing opening 79. The amount of movement of the link 75 during each application of the brakes is determined by the clearance between the brake shoes 32 and the shoe drum. As the brake shoes 32 become worn, it will be necessary to rotate the slack adjuster through an increasing angle to expand the shoes 32 into frictional contact with the drum. This greater rotation of the slack adjuster 20 in turn causes a greater reciprocation of the link 75 to rotate the worm gear and in turn take up the excess slack or clearance.

Figure 11:
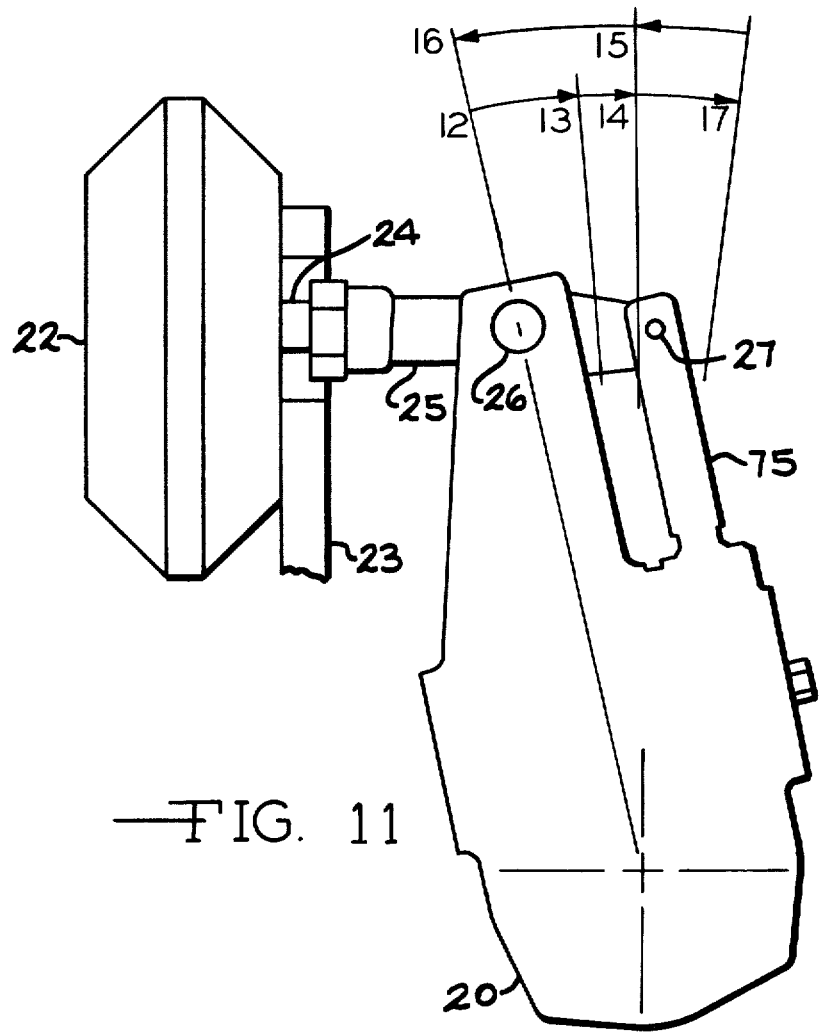
FIG. 11 is a pictorial side elevational view of an air piston connected to the slack adjuster of the present invention showing different positions of the slack adjuster during a braking cycle.

Turning now to FIGS. 11-16, the operation of the link 75 and the drive 65 are illustrated as the slack adjuster 20 is rotated through different increments. FIG. 11 shows a silhouette of the brake air chamber 22 and the slack adjuster 20. Points 12, 13 and 14 are labeled on FIG. 11 showing different positions of the slack adjuster 20 as the brakes are increasingly applied and points 15 and 16 are shown for different positions of the slack adjuster as the brakes are released. The relationships between the drive 65 and link 75 for the different points 12-16 are illustrated, respectively, in FIGS. 12-16.

Figure 12:
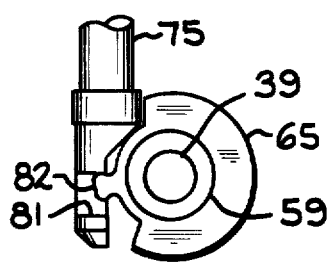
FIG. 12 is a pictorial illustration of the orientation between the link and the drive when the slack adjuster is at position 12 illustrated in FIG. 11.
Figure 13:
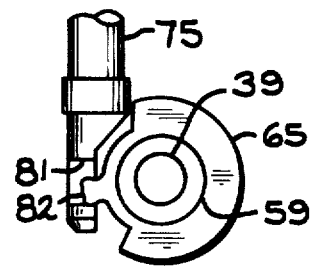
FIG. 13 is a pictorial illustration of the orientation between the link and the drive when the slack adjuster is at position 13 in FIG. 11.
Figure 14:
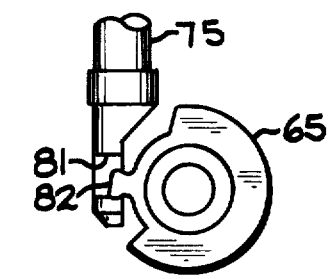
FIG. 14 is a pictorial illustration of orientation between the link and the drive when the slack adjuster is at position 14 in FIG. 11.

Position 12 is the initial starting position, illustrated in FIG. 12. The link 75 is in the full down position which immobilizes the drive. The coupling 61 at this time is engaged with the drive shaft 39. During initial application of the brakes, increasing air pressure within the chamber 22 rotates the slack adjuster 20 towards the position 13. Prior to reaching the position 13, the link 75 moves upwardly and the drive 65 remains stationary due to clearance between the drive tooth 82 and the link slot 81. This clearance establishes the desired slack or clearance between the brake shoes 32 and and brake drum. At the position 13, the link 75 has been raised to the point that the drive tooth 82 is in contact with the end of the link slot 81, as illustrated in FIG. 13. As the air pressure within the chamber 22 further increases and the slack adjuster 20 is rotated from the position 13 to the position 14, the link 75 further raises and rotates the drive 65 to a position shown in FIG. 14. Since the slip connection formed by the rounded teeth or corrugation 64 on the coupling 61 and the conical shaft shoulder 62 is engaged, rotation of the drive 65 between the positions 13 and 14 rotates the shaft 39 and, consequently, the rotating worm 40 advances the worm gear 38 to take up slack. At some point 14, the brake shoes engage with the brake drum. Pressures exerted on the slack adjuster 20 rapidly increase as the slack adjuster 20 is moved from position 14 to the position 17. This pressure is sufficient to allow slippage at the teeth 64 between the conical shaft surface 62 and the coupling 61 against the loading of the Belleville washers 50. Therefore, no further rotation of the shafts 39 will take place between the positions 14 and 17.

Figure 15:
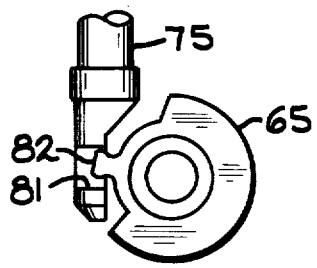
FIG. 15 is a pictorial illustration of the orientation between the link and the drive when the slack adjuster is at position 15 in FIG. 11.
Figure 16:
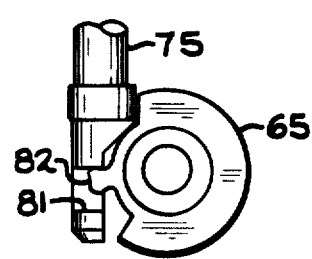
FIG. 16 is a pictorial illustration of the orientation between the link and the drive when the slack adjuster is at position 16 in FIG. 11.

When the brakes are subsequently released, the teeth 64 will re-engage and the link 75 will move downwardly until the drive tooth 82 abutts the upper end of the link slot 81 when the slack adjuster 20 is rotated back from a position 17 to a position 15, as illustrated in FIG. 15. Further rotation of the slack adjuster 20 from a position 15 to a position 16 wherein the brakes are fully released causes the drive 65 to rotate to the position illustrated in FIG. 16. As the drive 65 is rotated from position 15 to position 16, the ratchet teeth 67 and 66 between the coupling 61 and the drive 65, respectively, allow relative rotation between the coupling 61 and the drive 65. This rotation takes place against the weak force exerted by the spring 68. When the slack adjuster 20 reaches the final position 16, the brakes are totally released. As the brakes are repeatedly applied and released, the slack adjuster 20 will continue to repeat the above procedure until slippage of the teeth 64 between the shaft 39 and the coupling 61 is coincident with engagement of the drive tooth 82 with the end of the link slot 81, as illustrated by the position 13 shown in FIG. 13. In other words, the positions 13 and 14 coincide when the brakes are adjusted to the proper clearance. After this time, the proper slack travel will be accomplished and maintained.

The slack adjuster 20 is protected against over travel such as may occur during panic braking. If a high rotational force is applied to the slack adjuster 20 after the brake shoes are in contact with the brake drum, the Belleville washers 50 will collapse due to the high axial forces applied through the worm gear and the worm to the shaft 39. The collapsing of the Belleville washers 50 protects the slack adjuster 20 from damage and disengages the teeth 64 between the shaft 39 and the coupling 61 to prevent over adjustment of the vehicle brakes.

It will be appreciated that various changes and modifications may be made in the above-described embodiment of the slack adjuster 20. For example, the drive 65 is illustrated as having a drive tooth 82 while the link 75 has a slot 81 which receives the drive tooth 82. It should be appreciated that the drive tooth may be placed on the link 75 which in turn engages a slot formed in the drive 65. Various other changes and modifications also may be made without departing from the spirit and scope of the following claims.

We claim:

1. A slack adjuster for connecting an air actuated piston rod to rotate a cam shaft in a vehicle brake system comprising a housing, a worm gear mounted to rotate in said housing, means for connecting said worm gear to the cam shaft, said worm gear and said cam shaft rotating together about a first axis, a shaft mounted in said housing to rotate about a second axis perpendicular to said first axis, said shaft having first and second ends and defining a worm intermediate said ends engaged with said worm gear, a drive and a coupling each mounted coaxially to rotate on said shaft, ratchet means interconnecting said drive and said coupling for allowing said drive to rotate about said shaft axis relative to said coupling in only one direction, slip means interconnecting the coupling and said shaft, said slip means slipping when a predetermined rotational force is exerted between said coupling and said shaft, clevis means connecting said housing to the piston rod at a predetermined point spaced from said first axis, a link connected to said clevis means at a point spaced from the connection between said clevis means and said housing, and means interconnecting said link and said drive for rotating said drive and said coupling as the vehicle brakes are applied.

2. A slack adjuster, as set forth in claim 1, wherein said means interconnecting said link and said drive includes means for rotating said drive and said coupling only after said brakes are applied and the cam shaft has been rotated through a first predetermined increment, such first increment establishing a desired brake clearance.

3. A slack adjuster, as set forth in claim 2, wherein said means interconnecting said link and said drive includes a slot in one of said link and said drive, and a tooth on the other of said link and said drive, said tooth extending into and partially filling said slot, and wherein the clearance between said tooth and said slot establishes such first predetermined increment.

4. A slack adjuster, as set forth in claims 1, 2 or 3, wherein said slip means comprises abutting conical surfaces on said shaft and said coupling, said conical surfaces having mating rounded grooves, means mounting said shaft for limited axial movement, and spring means biasing said conical shaft surface into contact with said conical coupling surface.

* * * * *